United States Patent
Aimura et al.

(10) Patent No.: US 6,933,339 B2
(45) Date of Patent: Aug. 23, 2005

(54) NITRILE RUBBER COMPOSITION, VULCANIZABLE NITRILE RUBBER COMPOSITION, AND VULCANIZATE

(75) Inventors: Yoshiaki Aimura, Kawasaki (JP); Suguru Ito, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/257,973

(22) PCT Filed: Apr. 27, 2001

(86) PCT No.: PCT/JP01/03745
§ 371 (c)(1),
(2), (4) Date: Mar. 6, 2003

(87) PCT Pub. No.: WO01/83611
PCT Pub. Date: Nov. 8, 2001

(65) Prior Publication Data
US 2003/0166789 A1 Sep. 4, 2003

(30) Foreign Application Priority Data
Apr. 28, 2000 (JP) ..................................... 2000-130227

(51) Int. Cl.$^7$ ................................................. C08J 5/10
(52) U.S. Cl. ....................... 524/430; 524/432; 524/451; 524/492; 524/571; 524/572; 524/493
(58) Field of Search ................................ 524/430, 493, 524/572, 571, 492, 432, 451

(56) References Cited

U.S. PATENT DOCUMENTS

| | | | |
|---|---|---|---|
| 4,632,958 A | 12/1986 | Eshbach et al. ............ | 524/574 |
| 5,013,783 A | 5/1991 | Thörmer et al. ............ | 524/450 |
| 5,051,480 A | * 9/1991 | Coran ........................ | 525/227 |
| 5,432,226 A | * 7/1995 | Aonuma et al. ............ | 524/506 |
| 5,635,548 A | * 6/1997 | Kittle et al. ................ | 523/220 |
| 5,830,941 A | * 11/1998 | Aimura et al. .............. | 524/456 |
| 6,003,876 A | 12/1999 | Yamagishi et al. ......... | 277/407 |

FOREIGN PATENT DOCUMENTS

| | | |
|---|---|---|
| DE | 41 35 355 A1 | 4/1993 |
| JP | 9-137153 | 5/1997 |
| JP | 10-298350 A | 11/1998 |
| JP | 11-293039 A | 10/1999 |
| JP | 2000-26660 A | 1/2000 |
| WO | WO 01/55266 A1 | 8/2001 |

OTHER PUBLICATIONS

European Office Action dated Nov. 30, 2004.

* cited by examiner

Primary Examiner—David W. Wu
Assistant Examiner—Henry S. Hu
(74) Attorney, Agent, or Firm—Armstrong, Kratz, Quintos, Hanson & Brooks, LLP

(57) ABSTRACT

A vulcanizable nitrile rubber composition comprising 100 parts by weight of a nitrile rubber, 0.1 to 20 parts by weight of a metal silicate and 0.1 to 10 parts by weight of a vulcanizing agent. Vulcanization of this vulcanizable rubber composition gives a vulcanizate exhibiting enhanced heating aging resistance when it is kept in a hot air atmosphere, especially at a high temperature.

14 Claims, No Drawings

NITRILE RUBBER COMPOSITION, VULCANIZABLE NITRILE RUBBER COMPOSITION, AND VULCANIZATE

TECHNICAL FIELD

This invention relates to a rubber vulcanizate exhibiting an enhanced heat aging resistance when it is kept in a hot air atmosphere; and a nitrile rubber composition and a vulcanizable rubber composition, which are used as a raw material for the production of the rubber vulcanizate.

BACKGROUND ART

A nitrile rubber represented by an acrylonitrile-butadiene copolymer rubber (NBR) has hitherto been widely used as an oil-resistant rubber material in various fields. A highly saturated nitrile rubber prepared by reducing the amount of carbon-carbon unsaturated bond in the backbone chain was developed for satisfying a demand of placing on the market a rubber vulcanizate having enhanced heat-aging resistance and high tensile strength.

Hydrogenated NBR has a structure such that butadiene units in the molecular chain have been hydrogenated and thus the content of unsaturated bonds, i.e., double bonds, has been reduced to zero or an extremely small value. Therefore hydrogenated NBR has a remarkably enhanced resistance to oxidative degradation and Is highly evaluated as a heat aging-resistant rubber.

However, the currently available highly saturated nitrile rubber still has unsaturated bonds even only in a minor amount, the heat aging resistance in a hot-air atmosphere is liable to be poor. Therefore, additives to be incorporated in the highly saturated nitrile rubber for enhancing the heat aging resistance are being developed.

For example, Japanese Unexamined Patent Publication No. H11-293039 proposed the incorporation of a strong base, a salt of a strong base with a weak acid, or a salt of a weak acid in highly saturated nitrile rubber to minimize the reduction of elongation at break as encountered when the highly saturated nitrile rubber is kept in a hot-air atmosphere.

The incorporation of the proposed ingredients can reduce the reduction of elongation at break, but occasionally, the reduction of elongation cannot be minimized to a desired level. There is still a demand for the enhancement of heat aging resistance.

DISCLOSURE OF THE INVENTION

A primary object of the present invention is to provide a nitrile rubber vulcanizate exhibiting a minimized reduction of elongation at break even when it is left to stand in a hot air atmosphere for a long period of time.

The inventors conducted researches to achieve the above-mentioned object, and found that incorporation of a metal silicate in a nitrile rubber gives a rubber vulcanizate exhibiting a minimized reduction of elongation at break in a hot air atmosphere. Based on this finding, the present invention has been completed.

Thus, in a first aspect of the present invention, there is provided a nitrile rubber composition comprising 100 parts by weight of a nitrile rubber and 0.1 to 20 parts by weight of a metal silicate.

In a second aspect of the invention, there is provided a vulcanizable rubber composition, which comprises the above-mentioned nitrile rubber composition, and further comprises 0.1 to 10 parts by weight, based on 100 parts by weight of the nitrile rubber, of a vulcanizing agent.

Further, in a third aspect of the invention, there is provided a vulcanizate obtained by vulcanizing the above-mentioned vulcanizable nitrite rubber composition.

BEST MODE FOR CARRYING OUT THE INVENTION

The nitrile rubber composition of the present invention comprises 100 parts by weight of a nitrile rubber and 0.1 to 20 parts by weight of a metal silicate.

The nitrile rubber used in the present invention is a copolymer rubber made by copolymerization of an $\alpha, \beta$-ethylenically unsaturated nitrile monomer with other monomer. The monomer to be copolymerized with an $\alpha, \beta$-ethylenically unsaturated nitrile monomer is not particularly limited, and includes, for example, conjugated diene monomers, non-conjugated diene monomers and $\alpha$-olefin monomers. When an $\alpha, \beta$-ethylenically unsaturated nitrile monomer is copolymerized with a conjugated diene monomer, a copolymer rubber having a large iodine value tends to be produced. However, according to the need, this copolymer rubber may be hydrogenated whereby the carbon-carbon double bond is saturated and the iodine value is lowered.

The $\alpha, \beta$-ethylenically unsaturated nitrile monomer is not particularly limited, and, as specific examples thereof, there can be mentioned acrylonitrile, methacrylonitrile and $\alpha$-chloroacrylonitrile. Of these, acrylonitrile is preferable. The content of units of the $\alpha, \beta$-ethylenically unsaturated nitrile monomer in the nitrile rubber is preferably in the range of 10 to 60% by weight, more preferably 12 to 55% by weight and especially preferably 15 to 50% by weight.

The conjugated diene monomer is also not particularly limited, and, as specific examples of the conjugated diene monomer, there can be mentioned 1,3-butadiene, isoprene, 2,3-dimethyl-1,3-butadiene and 1,3-pentadiene. Of these, 1,3-butadiene is preferable.

The non-conjugated diene monomer is also not particularly limited and preferably includes those which have 5 to 12 carbon atoms. As specific examples of the non-conjugated diene monomer, there can be mentioned 1,4-pentadiene, 1,4-hexadiene, vinylnorbornene and cyclopentadiene.

The $\alpha$-olefin monomer is also not particularly limited and preferably includes those which have 2 to 12 carbon atoms, and, as specific examples thereof, there can be mentioned ethylene, propylene, 1-butene, 4-methyl-1-pentene, 1-hexene and 1-octene.

Other monomers can be copolymerized with an $\alpha, \beta$-ethylenically unsaturated nitrile monomer, provided that a substantially adverse influence is not exerted upon the effect of the present invention. As examples of such monomers, there can be mentioned $\alpha, \beta$-ethylenically unsaturated monocarboxylic acids, $\alpha, \beta$-ethylenically unsaturated dicarboxylic anhydrides, $\alpha, \beta$-ethylenically unsaturated carboxylic acid esters, aromatic vinyl monomers, and fluorine-containing vinyl monomers. Copolymerizable antioxidants may also be used. .

The $\alpha, \beta$-ethylenically unsaturated monocarboxylic acids include, for example, acrylic acid and methacrylic acid. The $\alpha, \beta$-ethylenically unsaturated dicarboxylic anhydrides include, for example, itaconic anhydride, fumaric anhydride and maleic anhydride.

As specific examples of the α, β-ethylenically unsaturated carboxylic acid esters, there can be mentioned methyl acrylate, methyl methacrylate, ethyl acrylate, ethyl methacrylate, n-dodecyl acrylate, n-dodecyl methacrylate, methoxymethyl acrylate, methoxymethyl methacrylate, α-cyanoethyl acrylate, α-cyanoethyl methacrylate, β-cyanoethyl acrylate, β-cyanoethyl methacrylate, cyanobutyl acrylate, cyanobutyl methacrylate, 2-hydroxyethyl acrylate, 2-hydroxyethyl methacrylate, monoethyl maleate, mono-n-butyl itaconate, dimethyl maleate, dimethyl fumarate, diethyl itaconate, dimethylaminomethyl acrylate, dimethylaminomethyl methacrylate, diethylaminomethyl acrylate, diethylaminomethyl methacrylate, trifluoroethyl acrylate, trifluoroethyl methacrylate, tetrafluoroethyl acrylate, tetrafluoroethyl methacrylate, fluorobenzyl acrylate and fluorobenzyl methacrylate.

As specific examples of the aromatic vinyl, there can be mentioned styrene, α-methylstyrene, vinylpyridine and o-trifluoromethylstyrene. As specific examples of the fluorine-containing vinyl, there can be mentioned fluoroethyl vinyl ether, fluoropropyl vinyl ether, difluoroethylene and tetrafluoroethylene. As specific examples of the copolymerizable antioxidant, there can be mentioned N-(4-anilinophenyl) acrylamide, N-(4-anilinophenyl) methacrylamide, N-(4-anilinophenyl)cinnamamide, N-(4-anilinophenyl)-crotonamide, N-phenyl-4-(3-vinylbenzyloxy)aniline and N-phenyl-4-(4-vinylbenzyloxy) aniline.

The Mooney viscosity ($ML_{1+4}$, 100°C.) of the nitrile rubber used in the present invention is not particularly limited, but is preferably in the range of 20 to 140 and more preferably 30 to 120. If the Mooney viscosity is too large, the mechanical strengths are low. In contrast, if the Mooney viscosity is too large, the processability becomes poor.

The iodine value of the nitrile rubber used in the present invention is also not particularly limited, but is preferably not larger than 120, more preferably not larger than 60 and especially preferably not larger than 30. Iodine value is a measure indicating the amount of unsaturated bonds in the backbone of polymer. If the iodine value is too large, the hot-air aging resistance is low. In the case when the iodine value must be lowered, the polymer is hydrogenation whereby unsaturated bonds in the molecule chain of rubber are saturated as mentioned above.

The method of producing the nitrile rubber used in the present invention is not particularly limited. The nitrile rubber can be produced by the conventional polymerization procedure, followed by, if desired, hydrogenation by the conventional hydrogenation procedure.

The polymerization procedure is also not particularly limited. The nitrile rubber is produced usually by radical copolymerization of the above-mentioned monomers. The polymerization may be carried out by a conventional procedure, which may be any of emulsion polymerization, suspension polymerization and solution polymerization procedures. Of these, an emulsion polymerization procedure is preferable.

Any limitation is not imposed to the optional hydrogenation of nitrile rubber, and the conventional hydrogenation procedure can be employed for selectively hydrogenating unsaturated bonds in the backbone of polymer.

The procedure of recovering nitrite rubber after the completion of polymerization or hydrogenation is also not particularly limited, and any known procedure can be employed provided that a substantial alteration of the properties of nitrite rubber can be avoided.

The metal silicate used in the present invention is a compound selected from those which are represented by the following general formula 1 to 3. Of these, a compound of general formula 1 is preferable.

   General formula 1:

$$M^1_2O \cdot xSiO_2 \cdot nH_2O$$

wherein x is a positive number, n is zero or a positive integer, and $M^1$ is a metal element having an oxidation number of 1,

   General formula 2:

$$M^2O \cdot ySiO_2 \cdot mH_2O$$

wherein y is a positive number, m is zero or a positive integer, and $M^2$ is a metal element having an oxidation number of 2.

   General formula 3:

$$M^3_2O_3 \cdot zSiO_2 \cdot pH_2O$$

wherein z is a positive number, p is zero or a positive integer, and $M^3$ is a metal element having an oxidation number of 3.

In general formula 1, $M^1$, that is a metal element having an oxidation number of 1, includes, for example, sodium and potassium. Of these, sodium is preferable. In general formula 2, $M^2$, that is a metal element having an oxidation number of 2, includes, for example, magnesium, calcium and iron. In general formula 3, $M^3$, that is a metal element having an oxidation number of 3, includes, for example, boron and aluminum.

As specific examples of the metal silicate, there can be mentioned, as those of general formula 1, metal orthosilicates such as sodium orthosilicate, sodium orthosilicate hydrate and potassium orthosilicate, and metal metasilicates such as sodium metasilicate pentahydrate and sodium metasilicate nonahydrate; as those of general formula 2, magnesium silicate, magnesium silicate hydrate, calcium silicate and calcium silicate hydrate; and, as those of general formula 3, boron silicate, boron silicate hydrate, aluminum silicate and aluminum silicate hydrate.

The amount of metal silicate in the nitrile rubber composition of the present invention is in the range of 0.1 to 20 parts by weight, preferably 0.3 to 15 parts by weight and especially preferably 0.5 to 10 parts by weight, based on the weight of the nitrile rubber. If the amount of metal silicate is too small, the rubber vulcanizate has poor heat aging resistance. In contrast, if the amount of metal silicate is too large, the rubber composition has too small processability on kneading, and therefore, becomes difficult to shape.

Ingredients which are conventionally used in the rubber industry can be incorporated in the nitrile rubber composition of the present invention. The ingredients include, for example, a reinforcing filler such as carbon black and silica, a non-reinforcing filler such as calcium carbonate and clay, a processing aid, a plasticizer, an antioxidant, an antiozonant and a colorant. The amount of these ingredients is not particularly limited provided that a substantial influence is not exerted on the object and effect of the present invention, and the amount thereof can appropriately be chosen depending upon. the particular object thereof.

Any limitation is not imposed on the method by which a metal silicate and optional other ingredients are incorporated in the nitrile rubber composition. A method of mixing and kneading together a nitrile rubber and a metal silicate by a roll or an internal mixer to give a nitrile rubber composition is preferable. Further, there can be employed a method of adding a metal silicate in a polymerization liquid during polymerization for the production of a nitrile rubber, and, after the termination of polymerization, the metal silicate is recovered together with the nitrile rubber to yield a nitrile rubber composition; and a method of adding a metal silicate in a polymerization liquid when or after the polymerization is terminated, and, after the polymerization liquid is thoroughly stirred, the metal silicate is recovered together with the nitrite rubber to yield a nitrile rubber composition.

In the case where hydrogenation of a nitrile rubber is carried out according to the need, a metal silicate can be incorporated in a reaction liquid during or after completion of the hydrogenation, and the metal silicate is recovered together with the nitrile rubber to yield a nitrile rubber composition. It is to be noted, however, that a metal silicate cannot be occasionally added before or during the hydrogenation because the hydrogenation reaction is impeded depending upon the particular combination of the metal silicate and a hydrogenation catalyst. Further, in some cases, it is difficult or even impossible to recover a metal silicate together with a nitrile rubber, or it is possible that a metal silicate is recovered only with a low yield. Therefore, an appropriate method of incorporating a metal silicate should be chosen depending upon the particular procedures of polymerization, hydrogenation and recovery.

The vulcanizable rubber composition of the present invention comprises 100 parts by weight of a nitrile rubber, 0.1 to 20 parts by weight of a metal silicate and 0.1 to 10 parts by weight of a vulcanizing agent. That is, the vulcanizable nitrile rubber composition comprises the above-mentioned nitrile rubber composition and a vulcanizing agent. The vulcanizable rubber composition is made into a vulcanizate by heating.

The vulcanizing agent used is not particularly limited, and it includes known sulfur and sulfur-containing vulcanizing agents, and organic peroxide vulcanizing agents. As specific examples of the sulfur and sulfur-containing vulcanizing agent, there can be mentioned sulfur such as powdery sulfur and precipitated sulfur; and organic sulfur compounds such as 4,4'-dithiomorpholine, tetramethylthiuram disulfide, tetraethylthiuram disulfide, and a high-molecular-weight polysulfide.

As the organic peroxide vulcanizing agent, those which are used as a vulcanizing agent in a rubber industry can be used. The organic peroxide vulcanizing agent includes, for example, dialkyl peroxides, diacyl peroxides and peroxy esters. Of these, dialkyl peroxides are preferable. As specific examples of the organic peroxide vulcanizing agent, there can be mentioned dialkyl peroxides such as dicumyl peroxide, di-t-butyl peroxide, 2,5-dimethyl-2,5-di(t-butylperoxy)-3-hexyne, 2,5-dimethyl-2,5-di(t-butylperoxy)hexane and 1,3-bis(t-butylperoxyisopropyl)benzene; diacyl peroxides such as benzoyl peroxide and isobutyryl peroxide; and peroxy esters such as 2,5-dimethyl-2,5-bis(benzoylperoxy)hexane and t-butylperoxyisopropyl carbonate.

The amount of vulcanizing agent is in the range of 0.1 to 10 parts by weight, preferably 0.2 to 7 parts by weight and especially preferably 0.3 to 5 parts by weight, based on 100 parts by weight of nitrile rubber.

More specifically, the amount of sulfur or sulfur-containing vulcanizing agent is preferably in the range of 0.2 to 7 parts by weight and especially preferably 0.3 to 5 parts by weight, based on 100 parts by weight of nitrile rubber. The sulfur and sulfur-containing vulcanizing agent are preferably used in combination with a vulcanization aid. A preferable vulcanization aid includes known vulcanization aids such as zinc oxide, a guanidine vulcanization accelerator, a thiazole vulcanization accelerator, a thiuram vulcanization accelerator and a dithiocarbamate vulcanization accelerator. As specific examples of the vulcanization accelerator, there can be mentioned guanidine vulcanization accelerators such as diphenylguanidine, diorthotolylguanidine and orthotolylbiguanidine; thiazole vulcanization accelerators such as 2-mercaptobenzothiazole and dibenzothiazyl disulfide; thiuram vulcanization accelerators such as tetramethylthiuram disulfide, tetraethylthiuram disulfide and N,N'-dimethyl-N,N'-diphenylthiuram disulfide; and dithiocarbamate vulcanization accelerators such as tellurium dimethyldithiocarbamate and zinc dimethyldithiocarbamate.

The amount of the organic peroxide vulcanizing agent is preferably in the range of 0.3 to 7 parts by weight and especially preferably 0.5 to 5 parts by weight, based on 100 parts by weight of nitrile rubber. The organic peroxide vulcanizing agent is usually used in combination with a vulcanization aid. A preferable vulcanization aid includes known vulcanization aids such as zinc oxide, magnesium oxide, triallyl cyanurate, trimethylolpropane trimethacrylate and N,N'-m-phenylene bismaleimide. The vulcanization aid may be used as a dispersion prepared by dispersing it in a filler such as clay, calcium carbonate or silica whereby a vulcanizable nitrile rubber composition having an enhanced processability can be obtained.

The kind and amount of vulcanization aid are not particularly limited and can be appropriately chosen depending upon the particular use of and properties required for a vulcanizate, and the particular kind of vulcanizing agent.

The method by which the vulcanizable nitrile rubber composition is prepared is not particularly limited. However, vulcanizing agents and vulcanization aids which are activated by heat must be incorporated with a nitrile rubber under conditions giving no heat to the vulcanizing agents and vulcanization aids. Usually a vulcanizing agent and a vulcanization aid are incorporated in and kneaded together with a nitrile rubber composition by a roll or other mixing and kneading means at a temperature lower than the vulcanization initiating temperature. When a vulcanization aid incapable of being activated by heat is used for the preparation of a vulcanizable nitrile rubber composition, the vulcanization aid can be mixed and kneaded together with other ingredients under heated conditions.

The vulcanizate of the present invention is obtained by vulcanizing the above-mentioned vulcanizable rubber composition. The procedure by which the vulcanizable rubber composition is vulcanized is not particularly limited. The vulcanization can be carried out by heating either after or simultaneously with shaping of the vulcanizable rubber composition.

The vulcanization temperature is preferably in the range of 100 to 200° C., more preferably 130 to 190° C. and especially preferably 140 to 180° C. When the vulcanization temperature is too low, a substantially long time is required for vulcanization or the vulcanization density tends to be low. In contrast, when the vulcanization temperature is too high, defective moldings are liable to be produced.

The vulcanization time varies depending upon the particular vulcanizing procedure, vulcanization temperature and shape of a vulcanizate, but is preferably chosen in a range of one minute to 5 hours.

The vulcanization procedure can be appropriately chosen from those which are conventionally employed in vulcanization of rubbers, and include, for example, press heating, vapor heating, oven heating and hot air heating.

The present invention will now be described specifically by the following examples and comparative examples. The physical properties were measured as follows.

Iodine value was measured according to JIS K6235.

Mooney viscosity was measured at 100° C. according to JIS K6300.

Tensile strength, elongation and 100% tensile modulus of a vulcanizate were measured according to JIS K6251. Hardness (Duro A) of a vulcanizate was measured according to JIS K 6253.

Accelerated aging test in hot air was carried out by allowing a specimen to stand at 150° C. in air for 168 hours, 336 hours or 504 hours, or at 175° C. in air for 168 hours, 336 hours or 504 hours. Elongation was measured before and after the accelerated aging, and elongation change was calculated according to the formula:

Elongation change (%)=[(B−A)/A]×100 wherein A and B are elongations as measured before and after the accelerated aging, respectively.

EXAMPLE 1

To 100 parts by weight of a hydrogenated acrylonitrile-butadiene copolymer rubber (acrylonitrile unit content: 36.2% by weight, iodine value: 4, Mooney viscosity: 65, tradename "Zetpol™ 2000L" available from Zeon Corporation, hereinafter referred to "nitrile rubber A"), were added 1 part by weight of octylated diphenylamine (antioxidant), 0.4 part by weight of a zinc salt of mercaptomethylbenzimidazole (antioxidant), 2 parts by weight of magnesium oxide (vulcanization aid), 2 parts by weight of zinc oxide (vulcanization aid), 35 parts by weight of wet white carbon (tradename "Carplex™ #1120" available from Shionogi & Co., Ltd.), 5 parts by weight of tri-(2-ethylhexyl) trimellitate (plasticizer), 1.5 parts by weight of triallyl isocyanurate (vulcanization aid), 1 part by weight of vinyltris(β-methoxyethoxy)silane and tetrasodium 1-silicate hydrate (3 parts by weight In Example 1, 6 parts by weight in Example 2 and 9 parts by weight in Example 3). The combined ingredients were mixed and kneaded together by a small-size Banbury mixer. To the kneaded mixture, 8 parts by weight of 2,2'-bis(terbutylperoxydiisopropyl)benzene (40% by weight grade; organic peroxide vulcanizing agent, tradename "Vul-cup™ 40KE" available from Hercules Co.) was added, and the mixture was kneaded together by a roll to give a vulcanizable nitrile rubber composition.

The vulcanizable nitrile rubber composition was press-cured at 170° C. for 20 minutes to give a sheet-form vulcanizate having a thickness of 2 mm. Dry mechanical strengths and elongation changes after accelerated aging in hot air of the vulcanizate were evaluated. The results are shown in Table 1.

REFERENCE EXAMPLE 1

A reactor was charged with 2 parts by weight of potassium oleate (emulsifier), 0.1 part by weight of potassium phosphate (stabilizer) and 150 parts by weight of water. Then 20 parts by weight of acrylonitrile, 15 parts by weight of butyl acrylate, 35 parts by weight of 1,3-butadiene and 0.45 parts by weight of t-dodecyl mercaptan (molecular weight modifier) were added, and further, 0.015 part by weight of ferrous sulfate (activator) and p-menthane hydroperoxide (polymerization initiator) to initiate emulsion polymerization at 10° C. When the polymerization conversion reached 60%, 10 parts by weight of acrylonitrile, 10 parts by weight of butyl acrylate and 10 parts by weight of 1,3-butadiene were added. Further, when the polymerization conversion reached 85%, 0.2 part by weight, per 100 parts by weight of the total monomers, of hydroxylamine sulfate was added to terminate a polymerization reaction. During polymerization, a slight bit of the polymerization liquid was taken at every 3% increase of the polymerization conversion to determine the content of each monomer in the small part of polymer. Subsequent to the termination of polymerization, the polymerization liquid was heated and subjected to steam distillation at 70° C. under a reduced pressure to recover unreacted monomers. Then 2 parts by weight of an alkylated phenol as an antioxidant was added to the polymerization liquid to give a copolymer latex.

The obtained copolymer latex was dropwise added to 3,000 parts by weight of an aqueous coagulating liquid maintained at 50° C. and having dissolved therein 3 parts by weight of calcium chloride as a coagulating agent whereby the copolymer latex was coagulated into a crumb. The crumb was washed with water and then dried at 50° C. under a reduced pressure.

The thus-obtained acrylonitrile-butyl acrylate-butadiene polymer was dissolved in methyl isobutyl ketone, and hydrogenated using a palladium/silica catalyst in a pressure vessel.

The hydrogenated acrylonitrile-butyl acrylate-butadiene terpolymer (hereinafter referred to "nitrile rubber B") had an acrylonitrile unit content of 30% by weight, a butyl acrylate unit content of 25% by weight, an iodine value of 15, and a Mooney viscosity of 80. The extrapolated glass transition initiating temperature and extrapolated glass transition terminating temperature as measured by a differential scanning calorimeter were −39.1° C. and 31.3° C., respectively, namely, the temperature difference therein was below 10° C.

The above-mentioned monomer unit contents in nitrile rubber B were determined according to $^1$H-NMR and a nitrogen content determining procedure according to a semi-micro-kjeldahl method. It was confirmed that each of the thus-measured monomer unit contents was in agreement with the difference between the amount of monomer used for polymerization and the amount of monomer remained unreacted.

EXAMPLE 4

Following the same procedures as employed in Example 1, a vulcanizate was made except that nitrile rubber B prepared in Reference Example 1 was used instead of nitrile rubber A. Dry mechanical strengths and elongation changes after accelerated aging in hot air of the vulcanizate were evaluated. The results are shown in Table 1.

EXAMPLE 5

Following the same procedures as employed in Example 1, a vulcanizate was made except that a hydrogenated acrylonitrile-butyl acrylate-butadiene terpolymer (acrylonitrile unit content: 44% by weight, iodine value: 15, Mooney Viscosity: 75; hereinafter referred to "nitrile rubber C") was used instead of nitrile rubber A. Dry mechanical strengths and elongation changes after accelerated aging in hot air of the vulcanizate were evaluated. The results are shown in Table 1.

TABLE 1

|  | Examples | | | | |
| --- | --- | --- | --- | --- | --- |
|  | 1 | 2 | 3 | 4 | 5 |
| Formulation of rubber composition (parts by weight) | | | | | |
| Nitrile rubber A | 100 | 100 | 100 | — | — |
| Nitrile rubber B | — | — | — | 100 | — |
| Nitrile rubber C | — | — | — | — | 100 |
| Tetrasodium 1-silicate hydrate | 3 | 6 | 9 | 3 | 3 |

TABLE 1-continued

|  | Examples | | | | |
|---|---|---|---|---|---|
|  | 1 | 2 | 3 | 4 | 5 |
| Tensile test | | | | | |
| Tensile strength (MPa) | 19.2 | 18.3 | 17.8 | 18.2 | 18.9 |
| Elongation (%) | 540 | 550 | 540 | 330 | 480 |
| 100% tensile stress (MPa) | 2.20 | 1.90 | 1.70 | 1.50 | 1.60 |
| Hardness (Duro A) | 71 | 70 | 70 | 67 | 70 |
| Elongation change in accelerated aging in hot air (%) | | | | | |
| 150° C. 168 hours | 7 | 6 | 9 | 5 | 8 |
| 336 hours | 8 | 12 | 14 | 13 | 10 |
| 504 hours | 3 | 6 | 10 | 4 | 5 |
| 175° C. 168 hours | −8 | −8 | −9 | −4 | −4 |
| 336 hours | −2 | 13 | 16 | −1 | 0 |
| 504 hours | −43 | −38 | −35 | −36 | −38 |

COMPARATIVE EXAMPLE 1

Following the same procedures as employed in Examples 1 to 3 vulcanizate was made except that sodium silicate was not incorporated in a nitrile rubber composition. Dry mechanical strengths and elongation changes after accelerated aging in hot air of the vulcanizate were evaluated. The results are shown in Table 2.

COMPARATIVE EXAMPLES 2 and 3

Following the same procedures as employed in Examples 1 to 3, vulcanizates were made except that 1 part by weight or 3 parts by weight of sodium carbonate was used instead of sodium silicate. Dry mechanical strengths and elongation changes after accelerated aging in hot air of the vulcanizate were evaluated. The results are shown in Table 2.

COMPARATIVE EXAMPLE 4

Following the same procedures as employed in Example 4, a vulcanizate was made except that sodium silicate was not incorporated in a nitrile rubber composition. Dry mechanical strengths and elongation changes after accelerated aging in hot air of the vulcanizate were evaluated. The results are shown in Table 2.

COMPARATIVE EXAMPLE 5

Following the same procedures as employed in Example 5 a vulcanizate was made except that sodium silicate was not incorporated in a nitrile rubber composition. Dry mechanical strengths and elongation changes after accelerated aging in hot air of the vulcanizate were evaluated. The results are shown in Table 2.

TABLE 2

|  | Comparative Examples | | | | |
|---|---|---|---|---|---|
|  | 1 | 2 | 3 | 4 | 5 |
| Formulation of rubber composition (parts by weight) | | | | | |
| Nitrile rubber A | 100 | 100 | 100 | — | — |
| Nitrile rubber B | — | — | — | 100 | — |
| Nitrile rubber C | — | — | — | — | 100 |
| Sodium carbonate | — | 1 | 3 | — | — |
| Tensile test | | | | | |
| Tensile strength (MPa) | 23.9 | 21.2 | 20.8 | 20.4 | 22.4 |
| Elongation (%) | 530 | 510 | 500 | 360 | 490 |
| 100% tensile stress (MPa) | 2.70 | 2.80 | 2.90 | 2.10 | 2.20 |
| Hardness (Duro A) | 72 | 71 | 71 | 68 | 71 |
| Elongation change in accelerated aging in hot air (%) | | | | | |
| 150° C. 168 hours | −6 | 9 | 12 | −5 | −8 |
| 336 hours | −18 | 9 | 15 | −15 | −22 |
| 504 hours | −24 | 6 | 18 | −20 | −32 |
| 175° C. 168 hours | −8 | 0 | −6 | −4 | −10 |
| 336 hours | −43 | −6 | 12 | −39 | −53 |
| 504 hours | −95 | −96 | −93 | −93 | −100 |

The vulcanizate made in Comparative Example 1 wherein a metal silicate was not incorporated in a rubber composition exhibited a large elongation change under a heat load especially at a high temperature, i.e., 175° C. than those of vulcanizates made in Examples 1–3 wherein the same nitrile rubber A was used and a metal silicate was incorporated in respective rubber compositions.

The vulcanizates made in Comparative Examples 2 and 3 wherein sodium carbonate was incorporated instead of a metal silicate in rubber composition exhibited a large elongation change under a heat load especially at a high temperature, i.e., 175° C., and for many hours, i.e., 504 hours, than those of vulcanizates made in Examples 1–3 wherein the same nitrile rubber A was used and a metal silicate was incorporated in respective rubber compositions.

The vulcanizates made in Comparative Examples 4 and 5 wherein a metal silicate was not incorporated in a rubber composition exhibited a large elongation change under a heat load than those of vulcanizates made in Examples 4 and 5 wherein the same nitrile rubbers B and C were used, respectively, and a metal silicate was incorporated in respective rubber compositions.

Industrial Applicability

The vulcanizate of the present invention has excellent resistance to heat aging under hot air atmosphere. Making efficient use of this property, the vulcanizate is useful as articles used in hot air atmosphere for many hours, for example, automobile parts such as an O-ring, a seal, a packing, a gasket, a diaphragm, a hose and a belt.

What is claimed is:

1. A nitrile rubber composition comprising 100 parts by weight of a nitrile rubber having an iodine value of not larger than 60 and 0.3 to 15 parts by weight of a metal silicate represented by the following general formula 1

   general formula 1:

wherein x is a positive number, n is zero or a positive integer, and $M^1$ is a metal element having an oxidation number of 1; wherein the total of all rubber ingredients in the nitrile rubber composition is 100 parts by weight.

2. The nitrile rubber composition according to claim 1, wherein the nitrile rubber contains 10% to 60% by weight of α,β-ethylenically unsaturated nitrile monomer units.

3. The nitrile rubber composition according to claim 1, wherein the nitrile rubber has been hydrogenated.

4. The nitrite rubber composition according to claim 1, wherein the metal silicate is a metal orthosilicate or a metal metasilicate.

5. The nitrite rubber composition according to claim 1, wherein the metal silicate is selected from sodium orthosilicate, sodium orthosilicate hydrate, potassium orthosilicate, sodium metasilicate pentahydrate, sodium metasilicate nonahydrate, magnesium silicate, magnesium silicate hydrate, calcium silicate, calcium silicate hydrate, boron silicate, boron silicate hydrate, aluminum silicate and aluminum silicate hydrate.

6. The nitrile rubber composition according to claim 1, wherein the metal silicate is present in an amount of 0.5 to 10 parts by weight based on 100 parts by weight of the nitrile rubber.

7. A vulcanizable rubber composition, which comprises the rubber composition as claimed in claim 1, and further comprises 0.1 to 10 parts by weight, based on 100 parts by weight of the nitrile rubber, of a vulcanizing agent.

8. The vulcanizable nitrile rubber composition according to claim 7, wherein the vulcanizing agent is sulfur or a sulfur-containing vulcanizing agent, or an organic peroxide vulcanizing agent.

9. The vulcanizable nitrile rubber composition according to claim 7, wherein the vulcanizing agent is sulfur or a sulfur-containing vulcanizing agent, and its amount is 0.2 to 7 parts by weight, based on 100 parts by weight of the nitrile rubber.

10. The vulcanizable nitrile rubber composition according to claim 7, wherein the vulcanizing agent is an organic peroxide vulcanizing agent and its amount is 0.3 to 7 parts by weight, based on 100 parts by weight of the nitrile rubber.

11. The vulcanizable nitrile rubber composition according to claim 8, which further comprises a vulcanizing aid.

12. The nitrile rubber composition according to claim 1, wherein the nitrile rubber has an iodine value of not larger than 30.

13. A vulcanizate obtained by vulcanizing the vulcanizable nitrile rubber composition as claimed in claim 7.

14. The vulcanizate according to claim 13, which is an automobile part selected from an O-ring, a seal, a packing, a gasket, a diaphragm, a hose or a belt.

* * * * *